(12) United States Patent
Danieau

(10) Patent No.: US 6,607,029 B2
(45) Date of Patent: *Aug. 19, 2003

(54) HEATING AND VENTILATING APPARATUS FOR A MOTOR VEHICLE WITH SELECTIVE CONTROL IN DIFFERENT ZONES OF THE CABIN

(75) Inventor: Jacques Danieau, Noisy le Roi (FR)

(73) Assignee: Valeo Climatisation (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,656

(22) Filed: Mar. 25, 1998

(65) Prior Publication Data
US 2002/0000314 A1 Jan. 3, 2002

(30) Foreign Application Priority Data
Mar. 25, 1997 (FR) .............................. 97 03614

(51) Int. Cl.$^7$ ............................ F25B 29/00; B60H 1/32; B60H 1/00
(52) U.S. Cl. ......................... 165/203; 165/42; 165/43; 237/12.3 A; 237/12.3 B; 454/126; 454/127; 454/160; 454/161; 454/319
(58) Field of Search ............................ 165/203, 42, 43; 454/126, 127, 160, 161, 156, 319; 237/12.3 A, 12.3 B

(56) References Cited

U.S. PATENT DOCUMENTS

| | | | | | |
|---|---|---|---|---|---|
| 2,040,893 A | * | 5/1936 | Young | .................. | 454/319 |
| 3,323,584 A | * | 6/1967 | Serratto | ............... | 165/103 |
| 3,881,546 A | * | 5/1975 | Otsuka et al. | ............ | 165/42 |
| 4,060,024 A | * | 11/1977 | Deck | ..................... | 454/319 |
| 4,482,009 A | | 11/1984 | Nishimura et al. | ........... | 165/43 |
| 4,537,245 A | * | 8/1985 | Nishimura et al. | ........... | 165/43 |
| 4,665,971 A | | 5/1987 | Sakurai | ................. | 165/43 |
| 4,730,662 A | * | 3/1988 | Kobayashi | .............. | 165/43 |

(List continued on next page.)

FOREIGN PATENT DOCUMENTS

| | | | | |
|---|---|---|---|---|
| DE | 3514359 | * | 10/1986 | .............. 165/203 |
| DE | 35 32 463 A1 | | 3/1987 | |
| EP | 0 424 879 | | 5/1991 | |
| EP | 0 503 987 | | 9/1992 | |
| FR | 2 717 747 | | 9/1995 | |
| GB | 988871 | * | 4/1965 | .............. 454/319 |
| JP | 0130815 | * | 8/1982 | .............. 165/203 |
| JP | 58-122213 | * | 7/1983 | .............. 165/43 |
| JP | 58-136813 | * | 9/1983 | .............. 165/203 |
| JP | 3-10922 | * | 1/1991 | .............. 165/203 |
| JP | 3-276813 | * | 12/1991 | .............. 165/203 |
| JP | 5-58144 | * | 3/1993 | .............. 165/203 |
| WO | 96 16827 | | 6/1996 | |

OTHER PUBLICATIONS

German Search Report, dated Jul. 28, 1998.

Primary Examiner—John K. Ford
(74) Attorney, Agent, or Firm—Morgan & Finnegan, LLP

(57) ABSTRACT

A motor vehicle cabin has four seat positions and a heating and ventilating apparatus which includes means for producing hot and cold air streams, temperature control means, air distribution ducts having outlets at different points in the cabin at each seat position, and distribution means for adjustably distributing the mixture of the cold and hot air streams between the various air distribution ducts. These ducts include ducts which are open in at least two different points in the rear seat positions, each of which has its own temperature control means for adjusting the air temperature at that position, and means for adjusting the flow of air to that position.

9 Claims, 5 Drawing Sheets

U.S. PATENT DOCUMENTS

| | | | | |
|---|---|---|---|---|
| 4,762,169 A | * | 8/1988 | Andersen et al. | 165/43 |
| 4,881,456 A | * | 11/1989 | Yasuda et al. | 165/43 |
| 4,901,788 A | * | 2/1990 | Doi | 165/42 |
| 4,949,779 A | * | 8/1990 | Kenny et al. | 165/203 |
| 5,101,883 A | * | 4/1992 | Kinmartin et al. | 165/43 |
| 5,156,204 A | * | 10/1992 | Doi | 165/43 |
| 5,181,553 A | * | 1/1993 | Doi | 165/43 |
| 5,186,237 A | * | 2/1993 | Adasek et al. | 165/43 |
| 5,316,074 A | * | 5/1994 | Isaji et al. | 165/43 |
| 5,478,274 A | * | 12/1995 | Danieau | 165/43 |
| 5,505,251 A | * | 4/1996 | Sarbach | 165/43 |
| 5,553,661 A | * | 9/1996 | Beyerlein et al. | 165/203 |
| 5,775,407 A | * | 7/1998 | Inoue | 165/203 |
| 5,878,806 A | * | 3/1999 | Denk et al. | 165/42 |
| 5,878,809 A | * | 3/1999 | Heinle | 165/42 |
| 5,975,422 A | * | 11/1999 | Ordberg | 237/2 A |

* cited by examiner

HEATING AND VENTILATING APPARATUS FOR A MOTOR VEHICLE WITH SELECTIVE CONTROL IN DIFFERENT ZONES OF THE CABIN

FIELD OF THE INVENTION

This invention relates to heating and ventilating apparatus for the cabin of a motor vehicle.

BACKGROUND OF THE INVENTION

Such apparatus conventionally comprises means for controlling temperature and means for mixing, manually or automatically and in adjustable proportions, streams of cold air and hot air produced by the apparatus, together with distribution means for distributing between various ducts the streams of cold and hot air mixed together. The apparatus may thus include control of several operating modes, such as deicing, ventilating, foot warming, and so on, such as to deliver the air towards the various ducts which terminate in outlets at different corresponding points within the cabin.

Heating and ventilating systems that are known up to the present time often include separate controls for temperature and air distribution, for each of the two front seat positions. However, as regards the rear seat positions in the cabin, it is generally arranged that one simple duct, branched from a front distribution duct, is provided, so that the occupants of the rear seats are able simply to open or close a shut-off valve in order to adjust the flow of air to the rear seat positions.

DISCUSSION OF THE INVENTION

One of the objects of the invention is to provide an improved heating and ventilating apparatus, which offers to each of the passengers in the rear seats the ability to control both temperature and air distribution, as may be required by that person individually. In other words, an object of the invention is to create a specific "micro comfort" zone in each of the four main seating positions in the vehicle, i.e. front right, front left, rear right and rear left, occupied by the passengers of the vehicle, so as to give the occupants a maximum of comfort.

More precisely, the invention is applicable to a heating and ventilating apparatus for the cabin of a motor vehicle of the known type described above, comprising: means for producing streams of cold or refrigerated air and hot air; temperature control means for mixing in adjustable proportions the streams of hot air and cold air; a plurality of air distribution ducts exhausting at different points in the cabin of the vehicle in the region of the front seat positions; and distribution means for distributing adjustably between the different air distribution ducts the streams of hot and cold air, which are mixed selectively as appropriate for the various operating modes.

According to the invention, in a heating and ventilating apparatus for the cabin of a motor vehicle, of the type comprising means for producing a stream of cold or refrigerated air and a stream of hot air;

temperature control means for mixing the hot and cold air streams in adjustable proportions;

a plurality of air distribution ducts exhausting at different points in the cabin of the vehicle in the region of the front seats; and distribution means for adjustably distributing the mixture of cold and hot air between the various air distribution ducts, selectively in accordance with various working modes, is characterised in that, the cabin being divided into a plurality of zones each defining a respective position in the cabin, the said positions being front seat positions corresponding to each of the front seats, and rear seat positions corresponding to each of the rear seats of the vehicle:

the said plurality of air distribution ducts further includes ducts exhausting in at least two different points in the cabin in each rear zone, i.e. in the zone of each of the rear seat positions;

a dedicated temperature control means is associated with each of the said rear zones of the cabin, each said temperature control means being adapted to adjust the temperature of air admitted to the said ducts which are open at the said two different points in that zone; and dedicated air distribution means are associated with each said rear zone of the cabin, for controlling the respective flows of air delivered through the said two different points.

According to a preferred feature of the invention, the two said different points comprise a point in the lower part of the cabin, a midheight point, and a point in an upper part of the cabin, the points in the lower part and at mid-height being preferably situated close to the vertical mid-plane of the vehicle, and the point in the upper part of the cabin being preferably situated at the side of the cabin, in the vicinity of the door.

According to another preferred feature of the invention, means are provided for temporarily closing off the ducts that exhaust into the zones corresponding to the rear seat positions when the distribution means are put into a rapid deicing mode.

According to a further preferred feature of the invention, the temperature control means include a set of multi-valve registers, cooperating with a heat exchanger, each of the said registers being actuated independently by the temperature control means corresponding to the front seat positions and the rear seat positions.

In that case, preferably, the multi-valve registers comprise a plurality of pivotable flap valves driven in rotation about respective axes which are parallel to each other, by a common mechanism such that the valves pivot through the same angle but in opposite directions as between one valve and the next in each register.

Preferably, the temperature control means further include a set of electrical resistance heaters, which are arranged to be energised independently by the temperature control means corresponding to the front seat positions and the rear seat positions.

In preferred embodiments, the multi-valve registers are disposed upstream of the heat exchanger, the temperature control means further including, downstream of the heat exchanger, means for closing off the duct connecting the heat exchanger to the ducts which exhaust into the zones of the rear seat positions, this closing off being carried out when the distribution means are put into a mode for ventilation by cold or refrigerated air.

In this last mentioned case, and if the above mentioned temporary closing means are also provided, the apparatus preferably further includes a valve which is movable selectively between at least three positions, namely a position for temporarily closing off the ducts that exhaust into the rear seat positions, a position for closing off the duct connecting the heat exchanger to the ducts that exhaust into the rear seat positions, and a position in which it closes off no duct.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
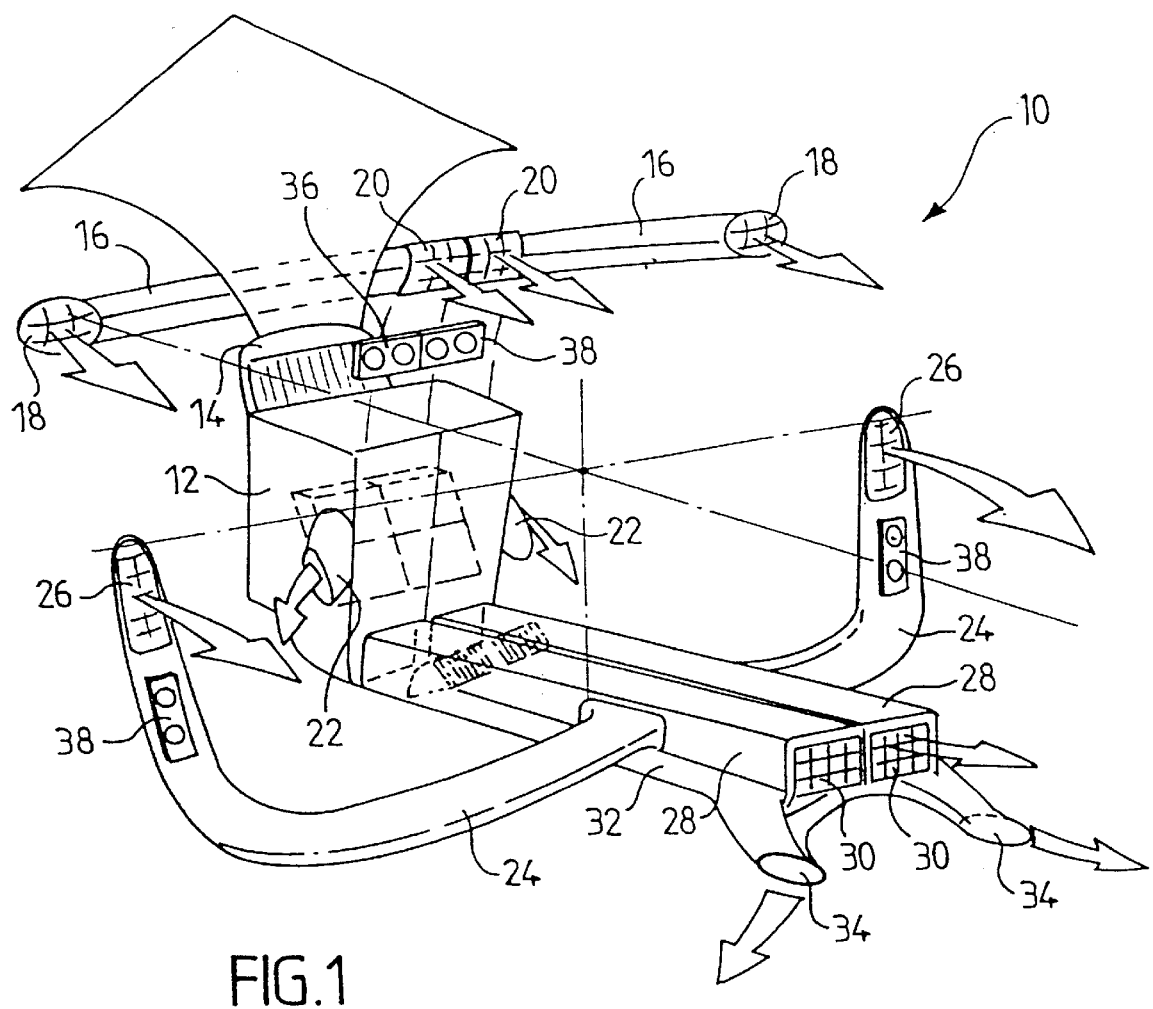
FIG. 1 is a perspective view showing the heating and ventilating apparatus of the invention with, in particular, its various air distribution ducts.

First of all it should be noted that, in the various Figures of the drawings, the same reference numerals always indicate similar elements of the apparatus.

Figure 2:
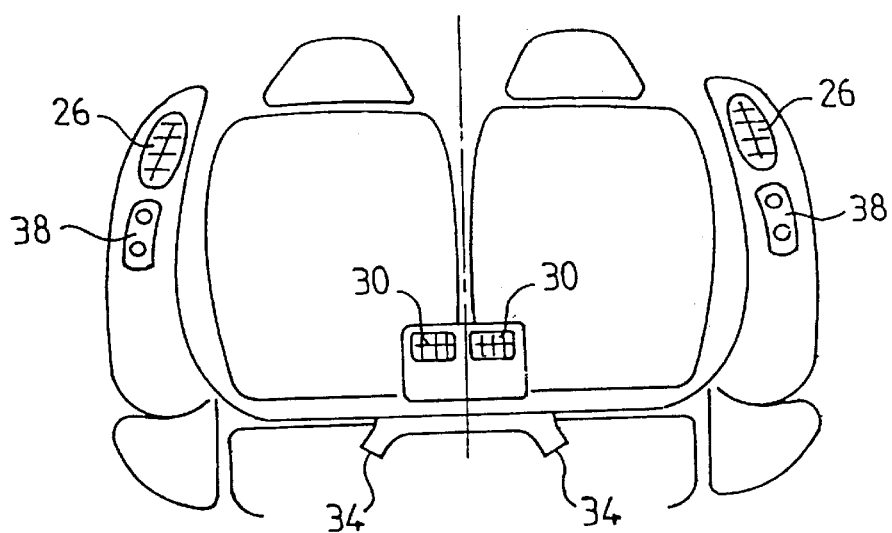
FIG. 2 shows the various vents and controls for adjusting purposes, available to the rear passengers, as seen from the back seat.

Reference is first made to FIGS. 1 and 2, which shows the general arrangement of the heating and ventilating apparatus 10 which is now to be described. The apparatus includes an air processing unit 12, for producing hot air and cold air, which may be cooled by refrigeration. The unit 12 produces streams of air which are distributed, in ways selected by the driver, into a plurality of air distribution ducts.

The air distribution ducts comprise, in the front part of the cabin, a deicing duct 14, upper ventilating and heating ducts 16, and lower ventilating and heating ducts 22. The deicing duct 14 delivers air in front of the fascia, directly towards the windshield. The upper ventilating and heating ducts 16 are open in a mid-height zone of the cabin of the vehicle through a set of vents, for example side vents 18 situated at the outer ends of the fascia, and central vents 20 which are situated close to the central console of the fascia. Finally, the lower ventilating and heating ducts 22 are located at foot level, so as to deliver air towards the feet of the occupants of the front seat, underneath the fascia.

A further set of air distribution ducts is also provided, leading towards the back seats of the vehicle. These further ducts are functionally independent of the distribution ducts 14, 16 and 22 which have just been described, and which are open in the region of the occupants of the front seats. In this way, the said further ducts enable the apparatus to be adjusted by the rear seat passengers independently of adjustments made by those in the front of the cabin. They also enable independent adjustments to be made as between the left hand side and the right hand side of the cabin.

In the example shown, these further ducts, or rear distribution ducts, consist of upper rear distribution ducts 24, middle distribution ducts 28, and lower distribution ducts 32. The upper rear ducts 24 are open in a zone of the cabin which is at mid-height or above, through upper vents 26, which may for example be situated in a side pillar as shown. These pillars are located between the front and rear doors of the cabin. The middle rear distribution ducts 28 are open through middle vents 30, at mid-height (for example at knee height) in the rear part of the cabin, for example, and as shown in FIG. 1, at the rear end of a trunk which is a horizontal extension of the central console of the vehicle, passing between the front seats.

The lower rear distribution ducts 32 are open through vents 34 close to the floor of the cabin, so as to direct air towards the feet of the rear passengers.

Controls for regulating temperature and air distribution are located conveniently for each of the four occupants of the vehicle, i.e. the driver, a front seat passenger and two rear seat passengers. These controls enable the condition of the air in each of the four zones of the cabin, i.e. front right, front left, back right and back left, to be adjusted independently.

Figures 3, 4:
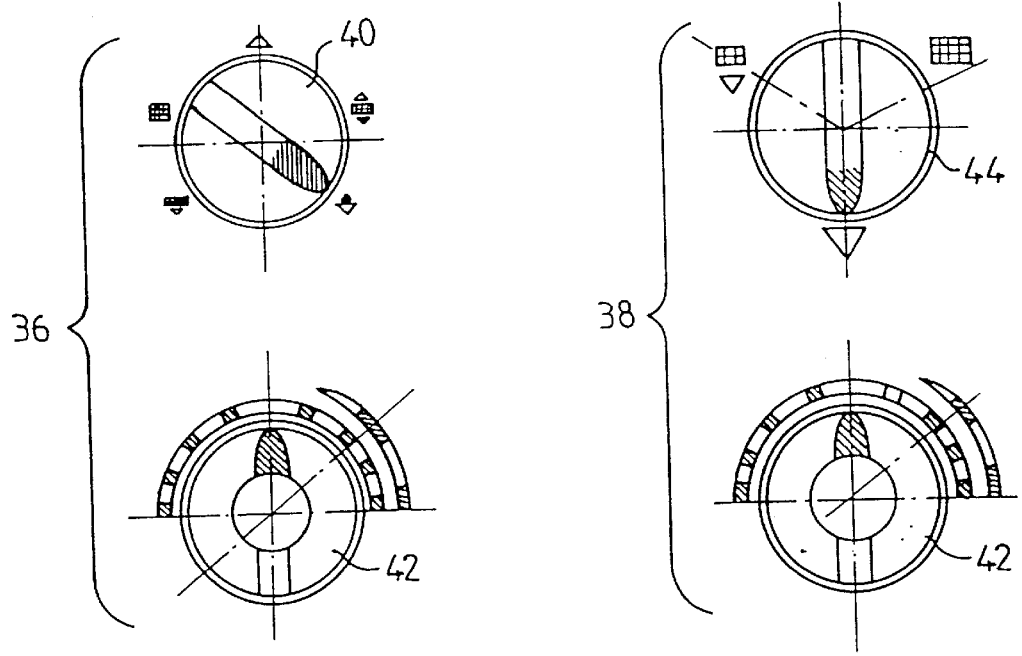
FIG. 3 shows in greater detail the controls available to the driver.
FIG. 4 shows in greater detail the controls available to the passengers.

Thus, the driver has a control 36 which is shown in greater detail in FIG. 3, while each of the three passengers has an independent control 38 which is shown in greater detail in FIG. 4. With reference therefore also to these two Figures, each of the controls 36 and 38 includes an air distribution control knob 40 or 44 respectively, or flow control knob, which provides adjustment for the distribution of air between the various air distribution ducts corresponding to any one of the zones in the cabin, in accordance with various operating modes known per se. These modes comprise heating and ventilating in the lower part of the cabin and/or in an upper part of the cabin; a "bi-level" mode, in which the air streams are stratified into two zones, with heating in the lower zone and ventilation in the upper zone; and so on. The driver's control knob 40 also has a "de-icing" position which is not present on the passenger's control knobs 44. As will be explained in greater detail below, this de-icing setting is a priority function which constitutes an exception to the independence of the controls in the various zones of the cabin.

Each of the controls 36 and 38 also includes a temperature control knob 42, which is arranged to be continuously movable between a "cold" position and a "hot" position. Each temperature control knob 42 may also be arranged so that, over the last part of its rotation, it causes an electrical resistance heater to be energised for the purpose of heating the air when the cooling circuit of the engine has not yet reached its working temperature.

The heating and ventilating apparatus also includes a motorised blower unit, of a kind known per se and not shown in the drawings. Apart from the de-icing function mentioned above, the blower unit is the only part of the installation with "mono-control", that is to say it is for example controllable only from one position. The control for the blower unit is for example in the form of a rotary knob situated on the control panel on the driver's side, for regulating the air flow velocity in the air delivered to the cabin by the blower.

Figure 5:
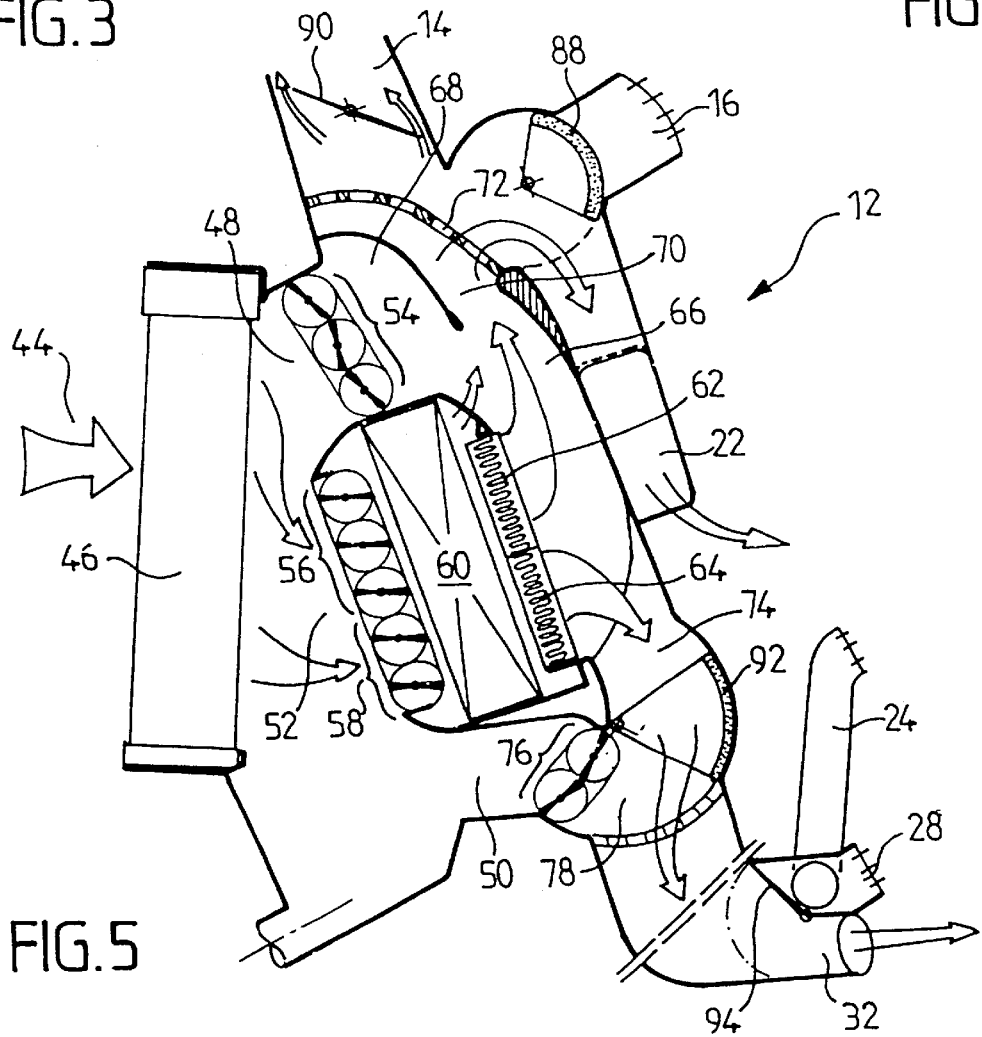
FIG. 5 is a view in cross section showing the apparatus of the invention and illustrating the circulation and distribution of the various air streams, in a "foot heating" configuration.
Figure 6:
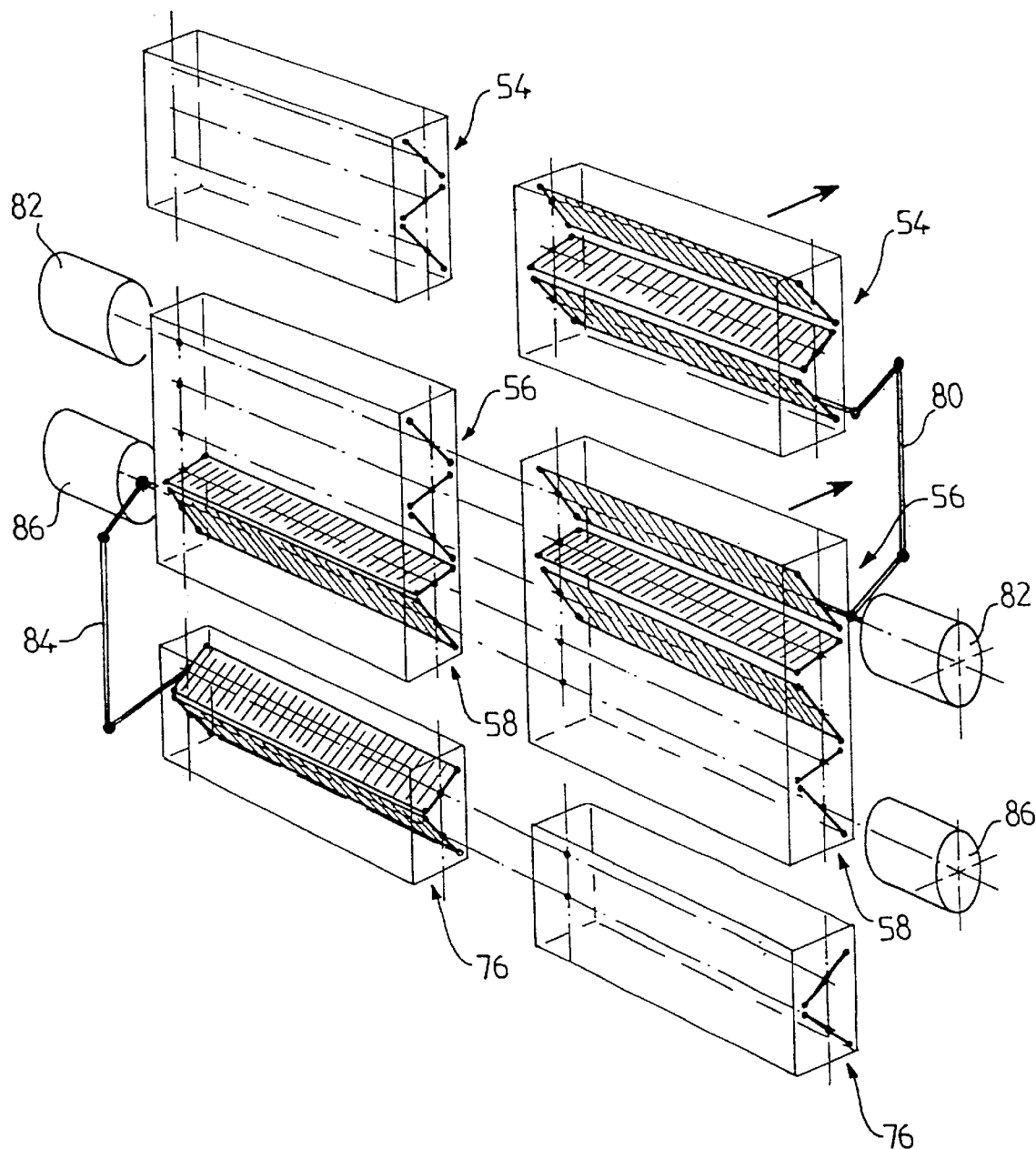
FIG. 6 is a diagrammatic perspective view of the various multi-valve distribution registers in the apparatus of the invention.

Reference is now made to FIGS. 5 and 6, which show in greater detail the structure of the air processing unit 12. The function of this unit is to produce the required cold air and hot air for the cabin, to regulate its temperature, and to distribute it as required. The unit will be described here with reference to FIGS. 5 and 6; the various settings or configurations of this unit are however shown in FIGS. 5 and 7 to 10, as explained above in the brief description of the drawings.

The stream of air drawn through an air admission inlet 44 may be passed through an evaporator 46, this being the case where the vehicle is equipped with air conditioning. The air stream is then divided into an upper cold air admission path 48, a lower cold air admission path 50, and a central path 52 for air which is to be heated. The cold air in the upper part of the unit, in the path 48, passes through an air flow regulating device 54, which is preferably in the form of a register, of the "multi-valve" type which is known per se, for example from International patent publication WO96/16827. This register comprises a set of butterfly valves which are synchronised by a common control means. The butterfly valves are articulated about their central axis of symmetry, and are driven simultaneously, all in the same direction, by a mechanism such as a crank.

In this connection, there are advantages in using a register in which, in addition, rotation of the valves is symmetrical as between one valve and the next, that is to say, for a valve which rotates in the clockwise direction, the adjacent valve will rotate in the opposite direction. In particular, such a configuration avoids the situation in which, regardless of the position, or current setting, of the register, the stream of air leaving the register flows in a direction having a lateral component, as is for example the case with registers in which all the valves are driven in the same direction. The absence of any lateral component gives ventilation in which the stream of air is particularly homogeneous, at right angles to the largest dimension of the flow path, and it enables the air processing unit as a whole to be made more compact.

The air flowing via the central path 52 flows through two registers 56 and 58, which are preferably again multi-valve registers, and which are, again, preferably arranged so that alternate valves rotate in opposite directions as described above for the register 54. The air leaving the registers 56 and 58 passes through a radiator 60, which is connected to the cooling circuit of the engine of the vehicle. This air also passes through two electrical resistance heaters 62 and 64. These are preferably of the positive temperature coefficient (PTC) type. The stream of air leaving the register 56 passes essentially through the resistance heater 62, while that passing through the register 58 passes essentially through the heater 64.

The stream of hot air which has passed through the register 56, the radiator 60 and the resistor 62 enters a hot air path 66, in which it is mixed with the cold air from the path 68 that has passed through the register 54. It then passes into a mixing chamber 70, in which the hot and cold air are thoroughly mixed, and this mixed air is diffused into the cabin of the vehicle via a turbulating grid 72. The air is passed towards the de-icing duct 14, the upper ventilating and heating ducts 16, and the lower ventilating and heating ducts 22, described above with reference to FIG. 1.

In the lower part of the unit 12, after having passed through the register 58, the radiator 60 and the resistance heater 64, the heated air is directed through a duct 74 into another mixing chamber 78, which receives cold air from the lower cold air admission path or duct 50, via a register 76. The register 76 is preferably of the same type as the register 54, that is to say a multi-valve register comprising butterfly valves each of which is rotatable in the opposite direction from the adjacent valve or valves.

The air is directed from the mixing chamber 78 towards the rear of the cabin, in which it is distributed via the upper rear distribution ducts 24, the middle rear distribution ducts 28, and the lower rear distribution ducts 32 described above with reference to FIGS. 1 and 2.

In the arrangement just described, the front part of the cabin is served by working parts (the registers 54 and 56 and the resistance heater 62) from the rear part of the cabin which is served by the registers 58 and 76 and the resistance heater 64. Each of these working parts, or elements, is in addition doubled up in order to provide different working parts for the right and left hand sides of the cabin. There are therefore two registers 54 arranged on either side of the vertical midplane of the vehicle, and similarly two registers 56, two registers 58, and so on. This duplication of the registers between the right and left hand sides is shown in particular in FIG. 6, which also shows the coupling of each group of registers 54, 56, for example through a coupling rod 80 which drives the two registers simultaneously under the control of a manual control knob or, and as shown in FIG. 6, under the control of a drive unit 82 in the form of a motorised reduction gear unit. In this latter case there is one of these drive units for the right hand side and another for the left. These registers are controlled in opposite directions, with progressive opening of the register 54 (for admission of fresh air) corresponding to a closing action of the register 56 (for admission of hot air), and vice versa. This causes the temperature of the mixed air to be varied by modifying the respective proportions of hot air and cold air, while keeping the general mass flow of the air substantially constant.

The registers 58 and 76, which respectively control the admission of hot air and cold air to the rear part of the cabin on each of the two sides, right and left, are coupled together in the same way by means of a coupling rod 84, which is for example actuated by a servomotor 86, such as to drive the two registers in opposite directions, whereby closing of a register 58 corresponds to opening of the associated register 76 and vice versa. This enables the temperature of the air directed towards the corresponding rear seat to be varied with a substantially constant mass flow.

The means whereby the stream of air, after being mixed, is distributed towards the various distribution ducts, will now be described. Here again, the various elements that will be described, both for the distribution of the air to the front seat occupants and to its distribution towards the rear seat occupants, are duplicated on either side of the vertical central plane of the vehicle, so that individual control of the conditions on either side of the vehicle can be obtained.

In respect of the front seats, the distribution means are conventional, with for example a rotary valve 88 for controlling the mass flow into the upper ventilating and heating duct 16 in the mid-height zone, and a valve 90, for example a butterfly valve, for admitting air to the deicing duct 14. In the configuration shown in FIG. 5, which corresponds to the foot heating configuration mentioned above, the valves 88 and 90 are closed so as to direct the whole of the air stream towards the lower duct 22, and thence into the lower part of the cabin adjacent to the feet of the front seat occupants. It will also be noted that the register 54 is open and the register 56 closed, so that the whole of the air stream is obliged to pass through the radiator 60 and the resistance heater 62, which may if required be energised so as to supplement the heat transferred in the radiator 60 when the engine has not yet reached its normal working temperature.

For distribution of the air into the lower part of the cabin, a valve is provided, for example a rotary valve 92, for controlling the passage of the air towards the various parts 24, 28 and 32 which deliver into the rear part of the cabin. The position shown in FIG. 5 also corresponds to a foot heating function for the occupant of the corresponding rear seat, but this function is totally independent of the mode chosen for the occupants of the front seats, which may be different at any given time. The register 76 is closed and the register 58 is open, so that all of the incident air is forced to pass through the radiator 60 and the resistance heater 64. The air delivered from the unit 12 is therefore at a maximum temperature. The valve 92 is open, so as to enable the air to be passed towards the rear seats. A further valve, such as the valve 94, is associated with each group of the ducts 24, 28 and 32, and is actuated by a control at the disposal of each of the two rear seat passengers (such as the control 44 in FIG. 4). This valve 94 enables the flow of air between each of the three ducts 24, 28 and 32 to be controlled at will. In the position shown, the inlet for the ducts 24 and 28 is fully closed by the valve 94, which therefore directs the whole of the stream of air to the duct 32 which exhausts into the lower part of the cabin, so as to heat the feet of the rear seat passenger on the corresponding side of the vehicle.

Figure 7:
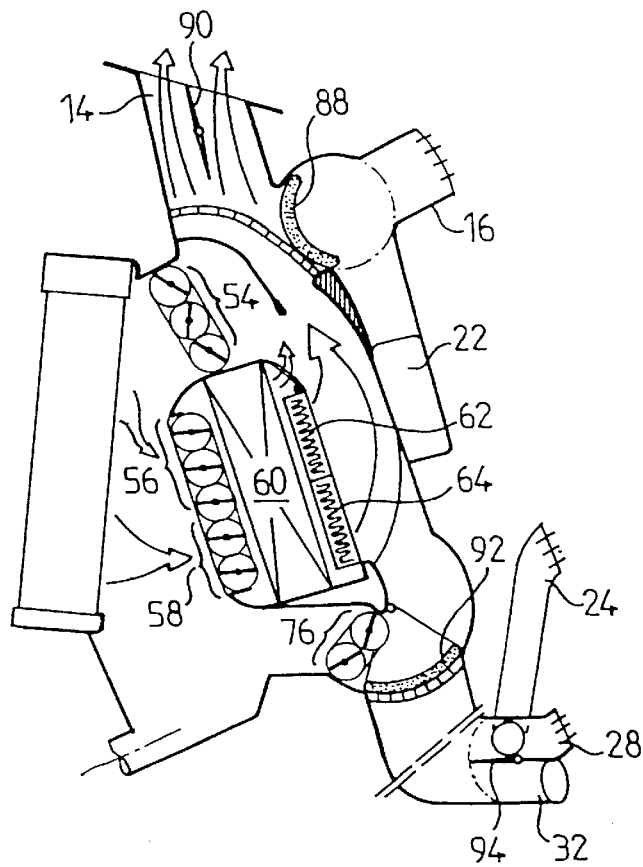
FIG. 7 is similar to FIG. 5 but illustrates a "fast deicing" configuration.

Reference is now made to FIG. 7, which shows the air processing unit 12 set in a configuration for providing the de-icing function. As mentioned above, this function is an exception to the principle whereby the air conditions in the four zones of the cabin can be adjusted independently of each other, having regard to its priority character. Thus, when the driver puts the air distribution control knob 40 (FIG. 3) into its "de-icing" position (indicated for example by the triangle at the top of the display of symbols surrounding the knob 40 in FIG. 3, only the driver's control knob 40 having this position), the various knobs and registers are all put automatically into the configuration shown in FIG. 7. A maximum flow of hot air is therefore forced towards the windshield. In this position, the cold air registers 54 and 76 are closed, and the hot air registers 56 and 58 are fully open, while the valves 88 and 92 are closed and the butterfly valve 90 is fully open. As a result, the whole of the incident stream of air passes through the radiator 60 and both of the resistance heaters 62 and 64, and is then forced into the de-icing duct 14, with all the other distribution ducts 16, 22, 24, 28 and 32 being closed. It will be noted that in this de-icing position, the air passing through the register 58 and the resistance heater 64, which would normally be intended for heating the rear seat positions, becomes added to the air that passes through the register 56 and the resistance heater 62, which would normally be used for heating the front seat positions. Accordingly, due to the closing of the valve 92, it is possible to prevent the air from being passed to the rear seat positions, so that the heat which would normally be delivered to them is saved, and is used instead to reinforce the de-icing of the windshield.

Figure 8:
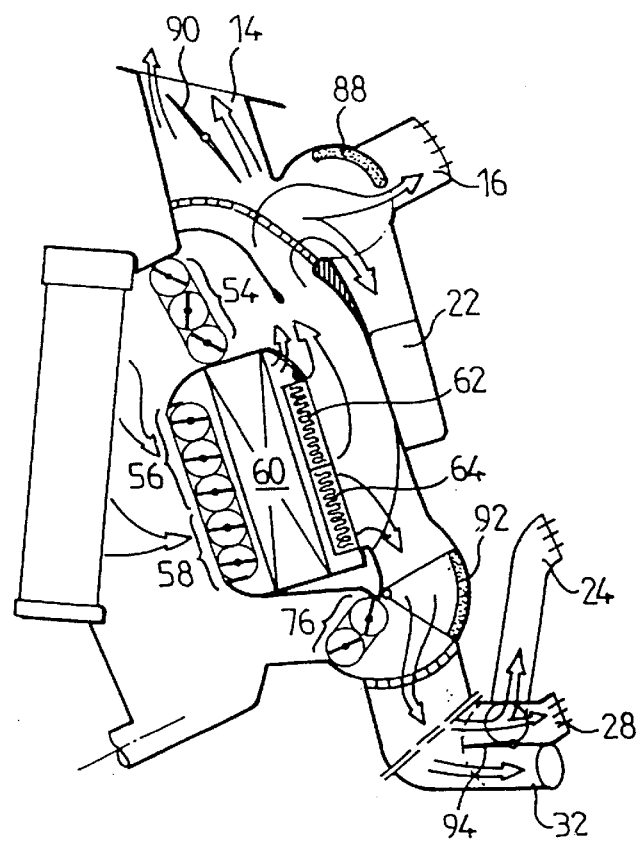
FIG. 8 is similar to FIG. 5 but illustrates a "general heating" configuration.

Reference is now made to FIG. 8, showing a general heating configuration in which the distribution means diffuse the air into all the various distribution ducts. Partial opening of the valve 88 and the butterfly valve 90 enable hot air to be passed to the ducts 14, 16 and 22, in respective proportions which are variable according to the position of the corresponding control knob (and therefore the valves 88 and 90). As regards the rear seat positions in the cabin, the valve 92 is open, and the valve 92 has been put into a middle setting such as to enable hot air to be diffused via the various rear ducts 24, 28 and 32. Here again it will be noted that the adjustment of the valve 94, which controls distribution to the corresponding rear seat position, is completely independent of adjustment for the front seat position, that is to say the position of the valves 88 and 90, thus ensuring the independence of the various adjustments in the different zones of the cabin.

Figure 9:
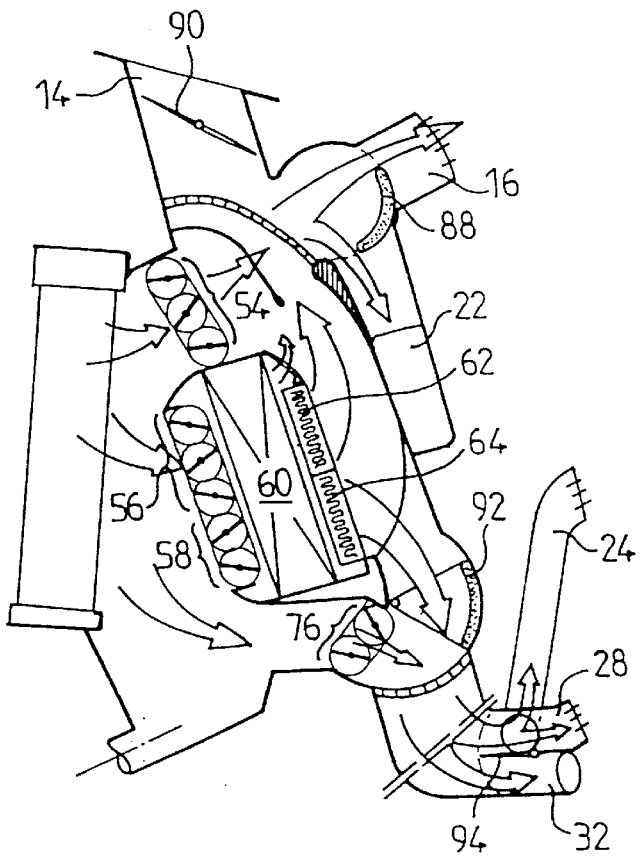
FIG. 9 is similar to FIG. 5, but illustrates a "bi-level" configuration, that is to say a setting in which heating is provided at two levels only.

FIG. 9 corresponds to a "bi-level" configuration, for use in weather conditions that are not extreme. The registers 56 and 58 are partially open, so as to produce a moderate quantity of hot air. The de-icing butterfly valve 90 is closed, because there is no danger of icing or freezing of the windshield, and the air is directed to the ducts 16 and 22, because the valve 88 is in an intermediate position and distributes the stream of air between the ducts 16 and 22. As regards the rear seat positions, the valve 92 is of course open, and each of the occupants can adjust the distribution of the air to the various ducts 24, 28 and 32 at will, this air being slightly heated because the register 58 is partially open.

Figure 10:
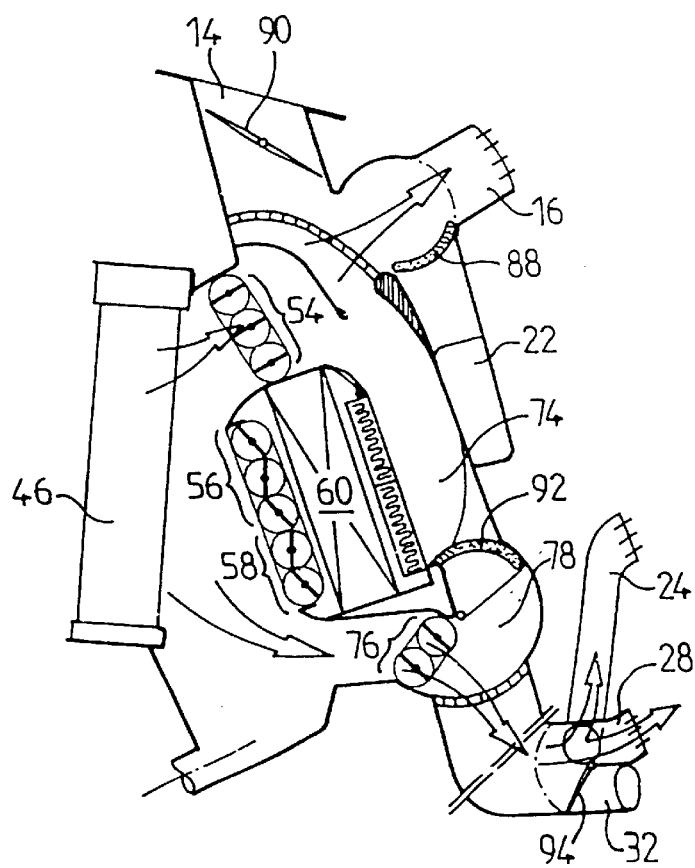
FIG. 10 is similar to FIG. 5, but illustrates a "ventilating and cooling" configuration.

Finally, FIG. 10 shows a ventilating position for use in hot weather. In this position, the registers 56 and 58 are closed, and the registers 54 and 76 are open, so as to force all of the cold air towards the various distribution ducts. If the vehicle is equipped with an air conditioning system, the air will of course first have passed through the evaporator 46 of the latter. In this configuration it is very advantageous to set the valve 92 in a third position (other than the open position seen in FIGS. 5, 8 and 9 and the closed position in FIG. 7), which isolates the space 74 downstream of the radiator 60 and the lower mixing chamber 78. In this way, any parasitic heating from the radiator 60 will not affect the stream of cold air distributed to the rear seat passengers.

What is claimed is:

1. An air conditioning unit for a motor vehicle having a passenger compartment with four micro-climate zones, the micro-climate zones comprising a front driver micro-climate zone, a front passenger micro-climate zone, a rear right micro-climate zone, and a rear left micro-climate zone, the unit comprising:

an air processing unit comprising, for each one of the micro-climate zones, (1) an air mixer chamber adapted to supply conditioned air to the one of the micro-climate zones from a cold air supply and from a warm air supply, (2) a warm air register to control the flow of war, air into the air mixer chamber, and (3) a cold air register to control the flow of cold air into the air mixer chamber;

a plurality of air distribution ducts comprising (1) for each one of the micro-climate zones, a heating and ventilating duct to deliver air to at least two points within the micro-climate zones, (2) and in each of the front driver and front passenger micro-climate zones, a deicing duct adapted to deliver air to a windshield a rear valve, for each the rear right and rear left micro-climate zones, that is downstream of the air processing unit, disposed to control the passage of air into the heating and ventilating ducts for the rear right and rear left micro-climate zones; and front valve, for each the front right and front left micro-climate zones, that is downstream of the air processing unit and is disposed to control the passage of air into the heating and ventilating ducts for the front right and front left micro-climate zones;

a deicing valve, for each the front right and front left micro-climate zones, that is separate from the front valve and is downstream of the air processing unit disposed to control the passage of air into the deicing duct for the front right and front left micro-climate zones; and a plurality of controllers, each of the controllers being adapted to independently adjust the temperature of the air admitted into a one of the micro-climate zones;

wherein, in a rapid deicing mode, the controllers are adapted to close the cold air registers, the front valves and the rear valves and to simultaneously open the warm air registers and the deicing valves so that a maximum flow of hot air is forced toward the windshield.

2. The air conditioning unit of claim 1, wherein, in a cooling mode, each of the rear valves is disposed to isolate the air mixer chamber from a radiator associated with the warm air supply to prevent parasitic heating of air supplied to the rear right and rear left micro-climate zones.

3. The air conditioning unit of claim 2, wherein each of the rear valves is a rotary valve that, in a first position permits air to pass into the heating and ventilating ducts for the rear right and rear left micro-climate zones, and in a second position prohibits air to pass into the heating and ventilating ducts for the rear right and rear left micro-climate zones, and in a third position permits air to pass into the heating and ventilating ducts for the rear right and rear left micro-climate zones and also isolates the air mixer chamber from the radiator to prevent parasitic heating of air supplied to the rear right and rear left micro-climate zones.

4. The air conditioning unit of claim 1, comprising
   a chamber having an inlet and a least four outlets;
   a evaporator disposed within the chamber to substantially occupy the inlet;
   a heat exchanger disposed within the chamber downstream of the evaporator to define, in each a right section and a left section of the chamber, (1) an upper cold air bypass and a lower cold air bypass wherein air bypasses the heat exchanger, and (2) a hot air zone wherein air may pass through the heat exchanger; and
   for each said outlet, the warm air register is adapted to control the flow of air through a portion of the hot air zone and the cold air register is adapted to control the flow of air through one of said cold air bypasses.

5. The air conditioning unit of claim 1, wherein each pair of the warm air register and the cold air registers are independently controlled.

6. The air conditioning unit of claim 1, wherein the at least two points comprise a lower point, a mid-height point, and an upper point.

7. The air conditioning unit of claim 1, wherein at least one of the cold air registers or at least one of the warm air registers is a multi-valve register.

8. The air conditioning unit of claim 7, wherein each said multi-valve register comprises:
   a plurality of valve members, each member being pivotal about an axis, said axes being parallel to one another; and
   a drive mechanism coupled to the valves of the register for rotating the valves about their respective axes, all by the same amount but in opposite directions as between adjacent valves.

9. A motor vehicle having a passenger compartment with four micro-climate zones, the micro-climate zones comprising a front driver micro-climate zone, a front passenger micro-climate zone, a rear right micro-climate zone, and a rear left micro-climate zone, the vehicle comprising a heating, ventilation and air conditioning system including an air conditioning unit comprising
   an air processing unit comprising, for each one of the micro-climate zones, (1) an air mixer chamber adapted to supply conditioned air to the one of the micro-climate zones from a cold air supply and from a warm air supply, (2) a warm air register to control the flow of warm air into the air mixer chamber, and (3) a cold air register to control the flow of cold air into the air mixer chamber;
   a plurality of air distribution ducts comprising (1) for each one of the micro-climate zones, a heating and ventilating duct to deliver air to at least two points within the micro-climate zones, (2) and in each of the front driver and front passenger micro-climate zones, a deicing duct adapted to deliver air to a windshield
   a rear valve, for each the rear right and rear left micro-climate zones, that is downstream of the air processing unit, disposed to control the passage of air into the heating and ventilating ducts for the rear right and rear left micro-climate zones; and
   a front valve, for each the front right and front left micro-climate zones, that is downstream of the air processing unit and is disposed to control the passage of air into the heating and ventilating ducts for the front right and front left micro-climate zones;
   a deicing valve, for each the front right and front left micro-climate zones, that is separate from the front valve and is downstream of the air processing unit disposed to control the passage of air into the deicing duct for the front right and front left micro-climate zones; and
   a plurality of controllers, each of the controllers being adapted to independently adjust the temperature of the air admitted into a one of the micro-climate zones;
   wherein, in a rapid deicing mode, the controllers are adapted to close the cold air registers, the front valves and the rear valves and to simultaneously open the warm air registers and the deicing valves so that a maximum flow of hot air is forced toward the windshield.

* * * * *

UNITED STATES PATENT AND TRADEMARK OFFICE
CERTIFICATE OF CORRECTION

PATENT NO.     : 6,607,029 B2                                          Page 1 of 1
DATED          : August 19, 2003
INVENTOR(S)    : Jacques Danieau It is certified that error appears in the above-identified patent and that said Letters Patent is hereby corrected as shown below:

Column 8,
Line 36, the word "war," should be replaced with -- warm --.
Line 51, the word -- a -- should be inserted before "front valve".
Line 64, the word "admited" should be replaced with -- admitted --.

Column 9,
Line 21, the phrase "a least four" should be replaced with -- at least four --.
Line 36, the phrase "warm air register" should be replaced with -- warm air registers --.

Signed and Sealed this

Second Day of December, 2003

JAMES E. ROGAN
*Director of the United States Patent and Trademark Office*